United States Patent
Brynielsson

(10) Patent No.: US 7,375,895 B2
(45) Date of Patent: May 20, 2008

(54) DEVICE AND SYSTEM FOR DISPLAY OF INFORMATION, AND VEHICLE EQUIPPED WITH SUCH A SYSTEM

(75) Inventor: Thore Brynielsson, Kullavik (SE)

(73) Assignee: AB Tryggit, Borgholm (SE)

( * ) Notice: Subject to any disclaimer, the term of this patent is extended or adjusted under 35 U.S.C. 154(b) by 0 days.

(21) Appl. No.: 10/590,961

(22) PCT Filed: Mar. 18, 2005

(86) PCT No.: PCT/SE2005/000404

§ 371 (c)(1),
(2), (4) Date: Jun. 27, 2007

(87) PCT Pub. No.: WO2005/089079

PCT Pub. Date: Sep. 29, 2005

(65) Prior Publication Data

US 2007/0285810 A1 Dec. 13, 2007

(30) Foreign Application Priority Data

Mar. 19, 2004 (SE) .................................. 0400730

(51) Int. Cl.
*G02B 27/14* (2006.01)
*G03H 1/10* (2006.01)
(52) U.S. Cl. ........................................ 359/630; 359/13
(58) Field of Classification Search ............... 359/630, 359/13
See application file for complete search history.

(56) References Cited

U.S. PATENT DOCUMENTS 5,469,298 A 11/1995 Suman et al.

(Continued)

FOREIGN PATENT DOCUMENTS

DE      10227467      1/2004

(Continued)

OTHER PUBLICATIONS

International Search Report (PCT/ISA/210).

*Primary Examiner*—Jordan Schwartz
*Assistant Examiner*—James C Jones
(74) *Attorney, Agent, or Firm*—Harness, Dickey & Pierce, P.L.C.

(57) ABSTRACT

A device is disclosed for displaying information in a vehicle. The device includes a unit for creating a real image containing information relevant to a driver, to be reflected in a reflective viewing surface located directly above the field of vision actively used by the driver to survey the traffic situation, and thereby generating a virtual image. The device further includes a second reflecting surface provided behind or beside the driver's head, with the driver in his or her normal position, at essentially the same level as the viewing surface or higher, an end section of an optical path between the unit and the viewing surface in use extending between said second reflecting surface and the viewing surface. By the optical path extending at least partly in the upper part of the driver's cab, a relatively long (several meters) optical path can be obtained without the need for complex mirror systems. In particular, this applies to commercial vehicles such as lorries and buses, which generally have an essentially vertical windscreen and plenty of free space above and in front of the driver.

20 Claims, 2 Drawing Sheets

U.S. PATENT DOCUMENTS

| | | |
|---|---|---|
| 5,615,023 A * | 3/1997 | Yang ........................... 359/13 |
| 5,731,903 A | 3/1998 | Cook |
| 6,414,796 B1 * | 7/2002 | Muromachi et al. ........ 359/630 |
| 6,674,370 B2 * | 1/2004 | Rodewald et al. ....... 340/815.4 |

FOREIGN PATENT DOCUMENTS

| | | |
|---|---|---|
| FR | 2844061 | 3/2004 |
| WO | 89/03059 | 4/1989 |
| WO | 91/00674 | 1/1991 |
| WO | 94/08264 | 4/1994 |

\* cited by examiner

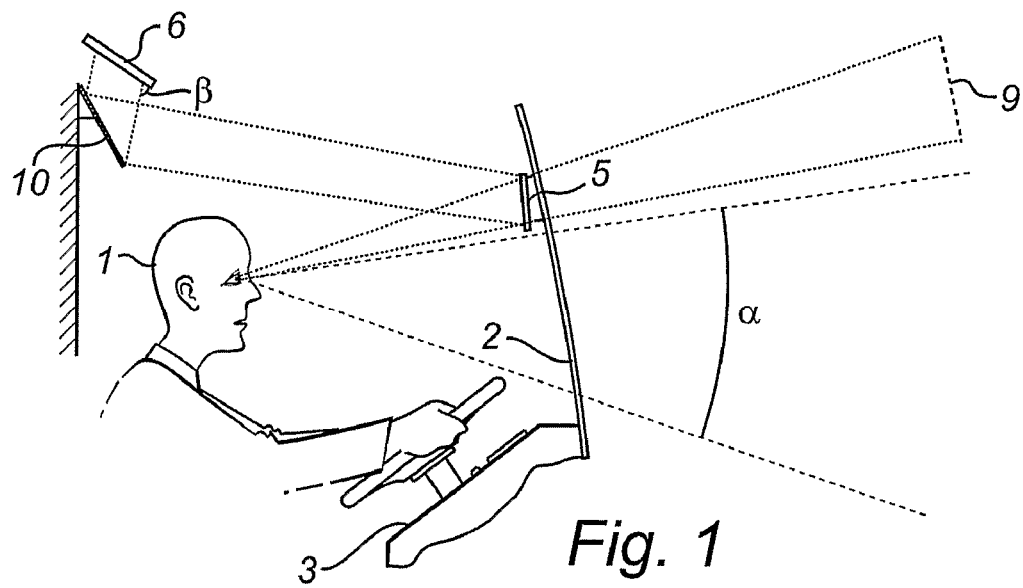
Fig. 1
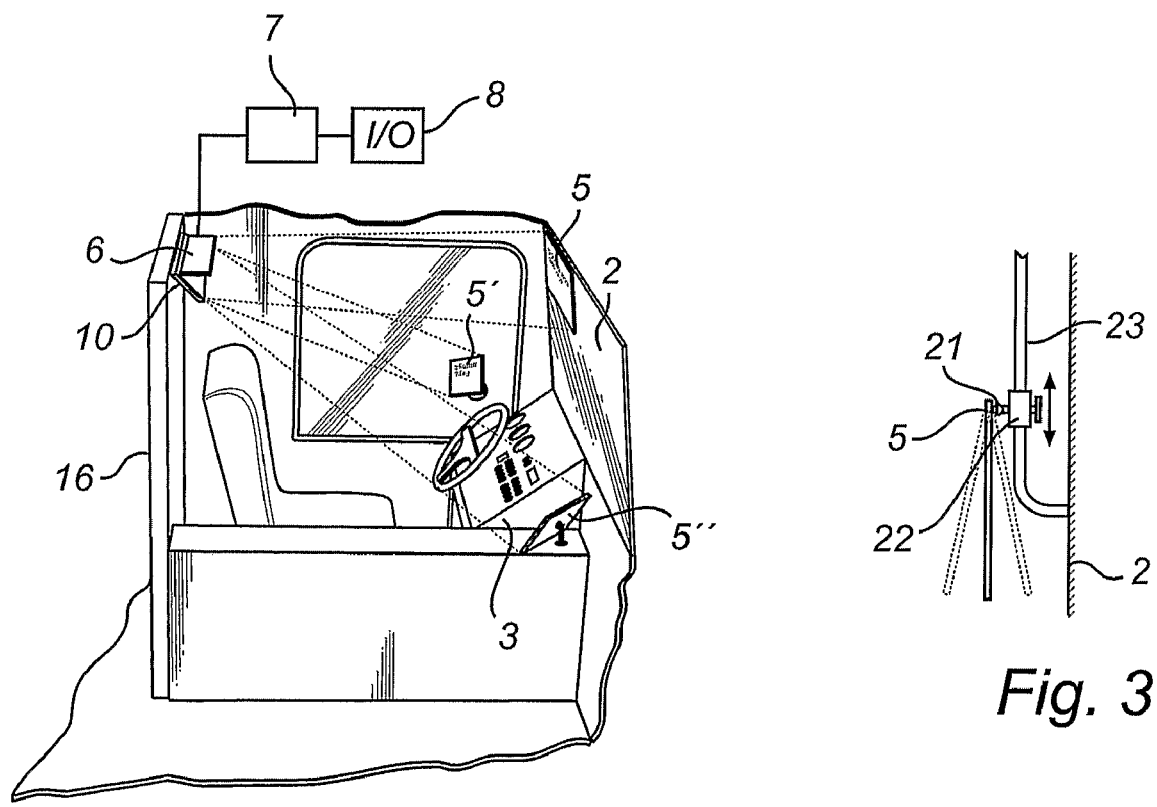
Fig. 2
Fig. 3

DEVICE AND SYSTEM FOR DISPLAY OF INFORMATION, AND VEHICLE EQUIPPED WITH SUCH A SYSTEM

PRIORITY STATEMENT

This application is the national phase under 35 U.S.C. § 371 of PCT International Application No. PCT/SE2005/000404 which has an International filing date of Mar. 18, 2005, which designated the United States of America and which claims priority on Swedish Patent Application number 0400730-8 filed Mar. 19, 2004, the entire contents of which are hereby incorporated herein by reference.

FIELD

The present invention generally relates to an improved and safer working environment for the driver of a vehicle. More specifically, at least one embodiment of the invention concerns a device for displaying information comprising a unit for creating a real image containing information relevant to the a driver, to be displayed in a reflecting viewing surface located directly above the field of vision actively used by the driver to survey the traffic situation, and thereby generating a virtual image by reflecting the real image. The invention further generally relates to a system comprising such a device, and a vehicle equipped with such a system.

BACKGROUND ART

In the working environment of a modern vehicle an ever-increasing amount of information can be made accessible to the driver. At the same time, almost all the available space of the driver's cab of a typical commercial vehicle is taken up by various devices and equipment, which makes it difficult to find a place to display the information. Providing a large, continuous display surface in front of the driver is impossible, since it would be partly concealed by the steering wheel, it would obstruct the view and distract the driver.

In the case of passenger cars, attempts have previously been made to reflect an image in the plane of the windscreen. Devices of this type are usually referred to as "head-up displays", because they allow the driver to read the information without looking down on the instrument panel. In a conventional head-up display, the unit creating the image is located in or adjacent to the instrument panel, i.e. in front of and obliquely below the driver, and the image is projected upwards onto the windscreen by way of mirrors and other optical elements. On the windscreen, which may have been treated with a reflection-enhancing material, a virtual image is then formed which provides the driver with the information displayed. One example of such a display is disclosed in WO 89/03059.

When the real image, as shown in WO 89/03059, is created obliquely below and in front of the driver, it is difficult, impossible even, to avoid the virtual image being created somewhere in the active field of vision used by the driver to survey the traffic situation. For this reason, the reflecting surface, which is thus located in the windscreen, is transparent so as not to obstruct the driver's view too much. Nevertheless, the virtual image may still interfere with the driver's view. Moreover, the transparent reflecting surface is such that the quality of the information displayed will be low, and only simple visual indications can be displayed.

A better solution is disclosed in WO 91/00674, in which an image source is arranged in the ceiling of a passenger car, and a mirror is arranged slightly above the driver's field of vision for the purpose of reflecting information generated by the image source. A similar solution is disclosed in WO 94/08264. To reduce the need for the driver to significantly adapt the eye focus when alternately looking at the area in front of the vehicle and the virtual image, it is advantageous for the reflected image to be located as far away from the driver as possible. In WO 91/00674, the mirror consisting of a holographic optical element achieves this.

Alternatively, the virtual image may be moved further away from the driver by extending the optical path between the real image and the mirror located adjacent the windscreen. In U.S. Pat. No. 5,731,903, this has been achieved by way of a complex system of mirrors. The device shown is not a head-up display in the strict sense of the word, since the virtual image is not projected onto the windscreen but displayed on a mirror recessed in the instrument panel. However, it is apparent from the specification that it is both time-consuming and expensive to provide a device featuring a long optical path, which can also be contained in an instrument panel.

SUMMARY

An object of at least one embodiment of the invention is to provide a simple and inexpensive "head-up display" allowing a more satisfactory positioning of the virtual image, inter alia to improve road safety.

According to a first aspect of at least one embodiment the invention, this and other objects are achieved by a device of the kind described by way of introduction, wherein a second reflecting surface is arranged behind or beside the driver's head, with the driver in his or her normal position, at essentially the same level as the viewing surface or higher, an end section of an optical path between the unit and the viewing surface extending between the second reflecting surface and the viewing surface.

Thus, the real image is reflected at least twice, first in the second reflecting surface and then in the viewing surface. By the optical path extending at least partly between the viewing surface and a second reflecting surface, behind or beside the driver, the path passes above or at the side of the driver in the upper part of the driver's cab. This allows a relatively long (several meters) optical path to be obtained without the need for complex mirror systems.

At least one embodiment of the invention is particularly advantageous for use in commercial vehicles such as lorries and buses, which generally have an essentially vertical windscreen and plenty of space available above and in front of the driver. Compared with a passenger car, a considerably larger image surface can be generated (for example by way of a large LCD screen), which allows a very large virtual image to be reflected at a considerable distance in front of the driver. This facilitates the display of large quantities of information appreciably.

This constitutes an improvement for the driver, who no longer has to shift eye focus when alternately looking at the surrounding traffic and the virtual image. Naturally, this is particularly important for drivers who need corrective lenses (e.g. reading glasses) to shift eye focus between distant or nearby objects.

Obviously, multiple mirrors can also be used. Using an odd number of reflections, the real image created by the image unit should be mirror-inverted. One advantage of using two (or any other even number) reflecting surfaces is that the real image can be generated turned the right way round. This allows the same image signal to be used for other displays arranged in other places in the vehicle.

Conveniently, the image unit and the second reflecting surface can form an integrated display unit, which makes it suitable for installation in existing vehicles. The integrated display unit can, for example, be adapted for mounting in a recess provided in an existing partition wall located behind the driver. In this case, the device may further include a second image unit, turned away from the driver, for displaying information to passengers in the vehicle.

Preferably, the integrated unit is arranged to be rotatable about one or two axes, to allow different displaying directions.

According to a second aspect of at least one embodiment the invention, the object is achieved by a system for displaying information in a vehicle, comprising a reflective viewing surface provided directly above the active field of vision used by the driver to survey the traffic situation, a unit for creating a real image containing information relevant to a driver, to be reflected in the viewing surface and thereby generating a virtual image, and a second reflecting surface provided behind or beside the driver's head, with the driver in his or her normal position, at essentially the same level as the viewing surface or higher, an end section of an optical path between the unit and the viewing surface in use extending between the second reflecting surface and the viewing surface.

Since the viewing surface is located directly above the active field of vision of the driver, i.e. the field of vision used when driving the vehicle, the viewing surface does not have to be transparent. On the contrary, the viewing surface can advantageously be non-transparent, i.e. a mirror, without obstructing the road view in any significant way. Such a mirror can convey information with better contrast than what is possible in a transparent viewing surface, thus allowing the device to convey more detailed information.

Furthermore, the system can include a second viewing surface to create a second virtual image in another place. Suitably, this second virtual image can be located in a position that is visible to the driver when he or she is carrying out administrative tasks. In the case of a bus driver, such tasks may be, for example, selling tickets or other forms of contact with passengers at a bus stop, during which the driver is turned to face boarding passengers. A lorry-driver may be required, for example, to check packing slips, delivery reports, etc in connection with the loading and unloading of goods. The second virtual image can also be located adjacent one of the vehicle's rear view mirrors to allow the driver to read information while checking the rear view mirror.

When using an image unit located in front of the driver, and a plurality of different viewing surfaces, it may be advantageous to provide several reflecting surfaces behind the driver, each with a slightly different inclination. If, on the other hand, the image unit is arranged behind the driver, adjacent the second reflecting surface, the reflecting surface (and possibly also the image unit) may instead be rotatable, in the manner described above, and may be automatically rotated when the driver swivels the driver's seat for the purpose of selling tickets, etc.

The viewing surface and/or the second reflecting surface can have such a curvature that the virtual image is magnified. Thus, the real image can be made smaller and still provide the driver with legible information. By using both the second reflecting surface and the viewing surface, each surface can be single-curved, which makes manufacture simpler and less expensive. Two single-curved surfaces also mean that a viewer (the driver) can move his or her head without the magnification being affected or the image distorted.

It is particularly advantageous for the second reflecting surface to be curved in such manner that it magnifies in the vertical direction and for the viewing surface to be curved in such manner that it magnifies in the horizontal direction. This allows vertical adjustment of the viewing surface without distortion of the image. Moreover, a driver can be expected to move his or her head to a greater extent in the lateral direction than in the vertical direction, wherefore it is suitable for the surface read by the driver (the viewing surface) to be laterally curved.

Advantageously, the system can be realized by way of a device according to the first aspect of an embodiment of the invention.

Alternatively, the image unit can be arranged at a distance from the second reflecting surface. It may, for example, be arranged in front of the driver, in which case the image is directed backwards towards the second reflecting surface, where it its reflected forward towards the viewing surface. A long optical path is thereby ensured.

In this case, the image unit may also be arranged to create an image comprising a first zone intended to be displayed to passengers in the vehicle, directly or after reflection, and a second zone intended to be reflected in the viewing surface. In this connection, the image unit can be used for multiple purposes at the same time, which improves the price-performance relation.

The second zone can be smaller than the first zone, so that the information displayed therein will be difficult for the passengers to read. The second zone can be magnified by the viewing surface and/or any other additional reflecting surfaces, as mentioned previously.

BRIEF DESCRIPTION OF THE DRAWINGS

Currently example embodiments of the invention will be described below, reference being made to the appended drawings.

FIG. 1 is a side view of a driver's cab in a bus, equipped with a first embodiment of a system according to the invention.

FIG. 2 is a perspective view of the driver's cab in FIG. 1.

FIG. 3 is a perspective view of a variant of the viewing surface in FIGS. 1-2.

DETAILED DESCRIPTION OF EXAMPLE EMBODIMENTS

Figure 4:
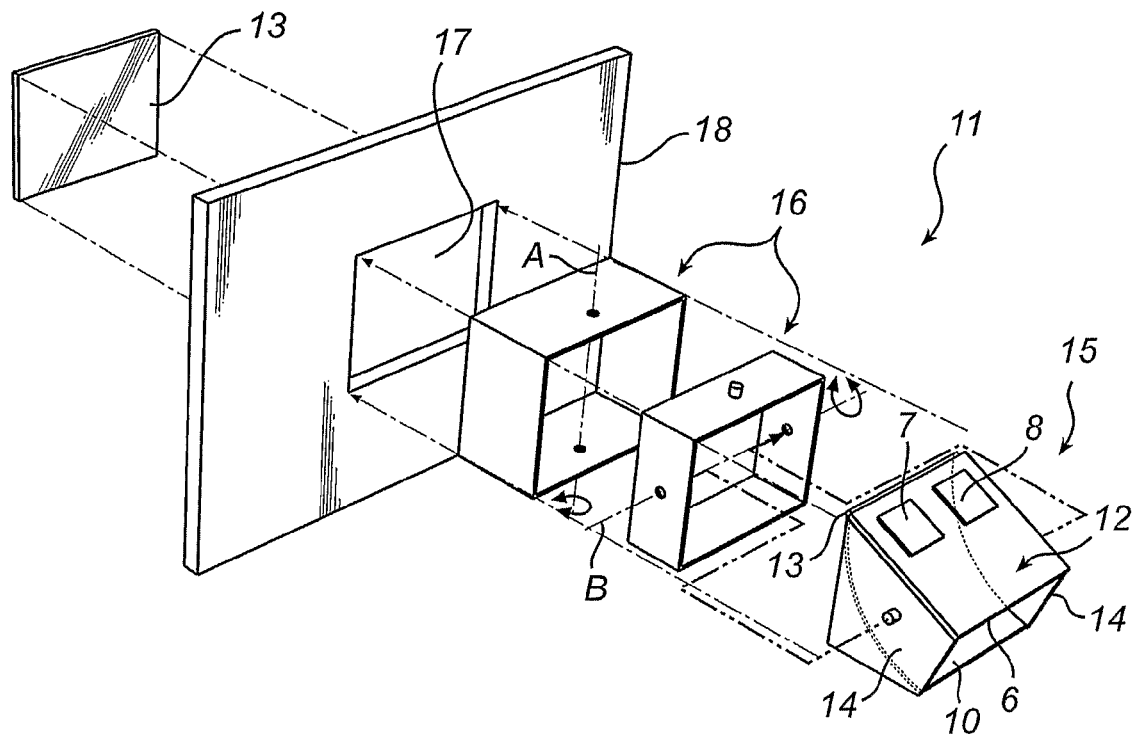
FIG. 4 is a perspective view of an embodiment of a device according to the invention.

FIG. 1 shows a driver's cab in a commercial vehicle, here a bus, in which a driver 1 is positioned behind an essentially vertical windscreen 2 and an essentially horizontal instrument panel 3. The driver's active field of vision, i.e. the angular area a used by the driver during normal driving, typically ranges from about 2 degrees (the driver is looking more or less straight ahead) to about −25 degrees (the driver is looking at the roadway in front of the bus). A reflecting surface 5 is provided directly above the active field of vision α. The surface can be transmissive, for example by coating the windscreen with a translucent, reflective layer, or non-transmissive, i.e. a mirror. This reflecting surface 5, which in the following will be referred to as viewing surface, may extend across essentially the whole width of the windscreen, but may also have a more limited extension.

As shown in FIGS. 1-2, the viewing surface can also be located in the plane of the windscreen, but may alternatively, as shown in FIG. 3, be a mirror 5 arranged on any type of holder. In this case, the holder is preferably adapted to allow both rotation of the mirror and adjustment of its vertical position to match the requirements of different drivers. FIG. 3 shows how a mirror 5 is mounted on a sleeve 22 by way of a ball joint 21, a locking screw allowing the sleeve 22 to be fixed along a bar 23, which in turn is attached to the windscreen 2. Naturally, corresponding adjusting features can be realised in various ways.

According to a first embodiment of the invention, as shown in FIGS. 1 and 2, a unit 6 adapted to generate a real image, hereinafter called image unit, is arranged obliquely behind and above the driver. The image unit can be, for example, an LCD screen carried out in per se known manner (e.g. TFT based), or another type of screen capable of displaying information in a satisfactory manner. Suitably, the image unit is connected to a control unit 7, which supplies the information to be displayed to the image unit 6. The control unit 7 may, in turn, be connected via an I/O unit 8 to the internal information system of the vehicle, from which it can access relevant information. Information displayed on the image unit can be information that is traditionally displayed on an instrument panel, such as speed, number of revolutions, time, etc. but also information associated more with the vehicle's utility function. In the case of a bus, such information may be, for example, bus service number, next stop, deviations from the timetable, driving directions to the next stop, images from surveillance cameras, reversing camera, and other cameras, etc. Furthermore, a second reflecting surface 10 is provided to reflect the image displayed in the image unit 6 in the direction of the viewing surface 5. The image is reflected once more in the viewing surface and, thus, by lifting his eyes only very slightly the driver gains access to a virtual image 9. The virtual image 9 is located a certain distance beyond the windscreen, at a distance corresponding to the distance between the real image in the image unit and the viewing surface. By positioning the viewing surface just above the active field of vision an excellent positioning is obtained with regard to traffic safety. Since this allows the driver to indirectly perceive the traffic situation he or she can read detailed information from the image unit during driving.

A control device, for example in the form of a finger wheel and a button, can allow simple navigation through a menu contained in the image 9. Thus, the driver can choose which contents is to be displayed in the image, and also control other functions of the vehicle, while keeping his or her eyes fixed straight ahead. Peripheral equipment such as radio, telephone, etc. can also be connected to the system, and controlled by way of the control device in interaction with the information displayed on the viewing surface.

The angle between the image unit 6 and the reflecting surface 10 is preferably such that the angle of incidence β from the viewing surface 5 towards the image unit 6 is not equal to 90 degrees. Thus, incident light, such as the light from the headlights of oncoming traffic, cannot generate disturbing reflexes in the image unit 6. Moreover, in the example shown, the image unit 6 is angled slightly downwards, which further reduces the risk of reflection from nearby light sources.

FIG. 4 shows a device according to an embodiment of the invention, which is suitable, for example, for carrying out the system in FIGS. 1 and 2. The device 11 includes a computer unit 12 with a display screen 6, a control unit 7 and an I/O unit 8, and a reflecting surface, such as a mirror 10. In the example shown, the mirror is arranged under the image unit 6, and extends obliquely downwards in the forward direction therefrom, so that an image displayed in the image unit is reflected in the forward direction from the device 11. End walls 14, for example of sheet metal, enclose the computer unit 12 and the mirror 10 to form an integrated unit 15. Optionally, the underside and/or rear side of the unit 15 are also formed of similar walls (not shown).

Preferably, the unit 15 or a part thereof is also rotatable. In the example shown, this has been achieved by suspending the unit 15 from a support structure 16, which allows the unit 15 to be rotated about two orthogonal axes A, B. In a simple example, the support 16 consists of two frames that are rotatingly arranged in one another (similar structures are used for suspending TV sets). Alternatively, the image unit 6 and the mirror 10 form a pivotally mounted cradle between the end walls 14, which thus allows rotation about a horizontal axis. Thus, the support structure must allow rotation only about a vertical axis. In certain applications, it may be sufficient to provide rotation of the unit 15 about a single axis.

The device 11 can be easily mounted on an existing partition wall 18 located behind the driver, and is thus a convenient way of realizing the invention in an existing vehicle. All that is required in addition to the device 11 is a viewing surface 5 located in front of the driver, which can be achieved as described above.

Alternatively, the device 11 can be mounted in a recess 17 in the partition wall 18. In this case, the device may further include a second display screen 13, arranged on the rear surface of the unit 15, i.e. oriented backwards in the vehicle when the device 11 is installed. The screen thus makes it possible to display information to the passengers of the vehicle. The information may be identical or partly identical to the information displayed to the driver, but this is in no way a necessary condition.

Suitably, part of the support structure 16 described above is mounted on or in the partition wall 18 to allow adequate vertical and lateral adjustment so that a driver who is looking at the viewing surface 5 has an unobstructed view between the end walls 14 and is able to see the entire real image displayed on the image unit 6. Alternatively, the device 11 is fixed to or in the partition wall 18, without the possibility of making simple adjustments once installed.

When using an adjustable device 11 it is also possible to control the vertical and lateral position by way of the control unit 7. This can be achieved either by the driver performing an adjustment operation by way of the control unit or automatically. In the latter case, it is possible to automatically set the location in which the real image will be accessible. Thus, in addition to fulfilling the individual requirements regarding the adjustment of the device 11 that may apply to different drivers, it is also possible to vary the orientation of the unit depending on the situation.

It may also be advantageous to have one or more additional viewing surfaces, located in different places in the driver's cab. FIG. 2 illustrates the arranging of a second viewing surface 5' adjacent the side window on the driver's side and a third viewing surface on the other side of the driver, for example in the direction of equipment used for selling tickets. The driver is able to perceive the second viewing surface 5' while looking at a rear view mirror outside the side window, and is able to perceive the third viewing surface when turned the other way, for instance when selling tickets or carrying out administrative tasks.

If multiple viewing surfaces are used, it is particularly advantageous to have an adjustable device 11, for example of the kind shown in FIG. 4, to allow display of the image in different viewing surfaces. It may be suitable to define different positions: for example a first position, in which the unit is oriented in such manner that the driver is able to see the image in the viewing surface 5, and a second position, in which the unit is oriented in such manner that the driver is able to see the image in the viewing surface 5". The changing over from one position to the other might then take place, for example, when the driver swivels his or her seat to attend to the sale of tickets.

Depending on the location of the different viewing surfaces 5, 5', 5", rotation about one or two axes may be required. According to one variant, all the viewing surfaces are located at the same height, which means that only rotation about a vertical axis is required. The rotation may suitably be synchronised with the rotation of the driver's seat, or with a signal from a sensor indicating the orientation of the driver's head.

In the embodiments shown, the reflecting surface 10 is arranged below the image unit 6. It may, of course, just as well be arranged above or beside the image unit.

Figure 5:
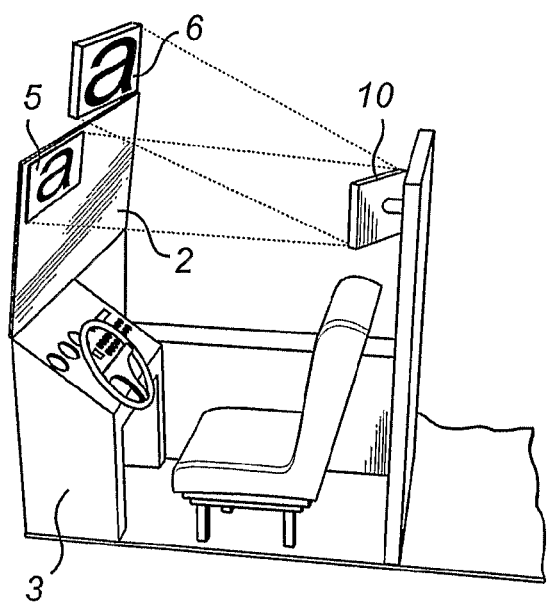
FIG. 5 is a perspective view of a driver's cab in a bus, equipped with a system according to a further embodiment of the invention.
Figure 6:
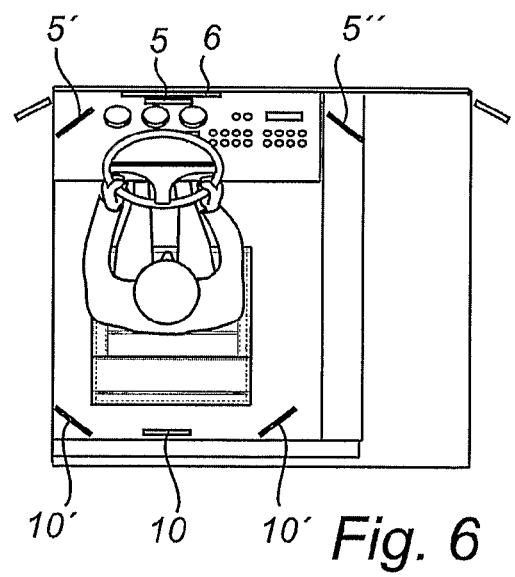
FIG. 6 is a variant of the system in FIG. 5, as seen from above.

According to an alternative embodiment, shown in FIG. 5 or 6, the image unit 6 is instead located beside or in front of the driver, and the second reflecting surface 10 is instead arranged approximately at the location of the image unit in FIGS. 1 and 2. The result, therefore, is similar to that of FIGS. 1 and 2, but with a virtual image that is located further away from the driver, which is made possible by the optical path between the image unit and the viewing surface being increased even further.

In this case too, the reflecting surface 10 can be rotatable, for example to allow display in multiple alternative viewing surfaces. Another way of allowing display in multiple viewing surfaces 5, 5', 5", in a more permanent manner, is here to provide multiple reflecting surfaces 10, 10', 10", as shown in FIG. 6. Each reflecting surface 10, 10', 10" is then oriented in such manner that it reflects the real image in the direction of the respective viewing surface.

One advantage of displaying multiple images at the same time is, for example, during reversing, when the image from a reversing camera is displayed in the image unit 6. The driver is then able to alternately check the left and right rear view mirror, respectively, while at the same time checking the image from the reversing camera on viewing surfaces located in the direction. Similarly, the image from a door camera can be displayed in the image unit and be visible in a viewing surface located in the same direction as the right rear view mirror. Furthermore, a surveillance camera can be activated and the image displayed in a viewing surface close to the inner rear view mirror. In all these cases, the driver can easily combine existing rear view mirrors with information from cameras.

One or more of the reflecting surfaces can be adapted, for example curved, to magnify the image generated by the image unit 6. Preferably, each surface 10 and 5 is curved in one direction only, which facilitates manufacture. FIG. 4 illustrates how the mirror 10 is curved about a horizontal axis and, thus, magnifies the image vertically. The viewing surface 5 is here suitably curved about a vertical axis for the purpose of magnifying the image in the lateral direction.

It will be noted that the invention is not limited to the embodiments described above. On the contrary, various variants will be apparent to the person skilled in the art, for example comprising more reflecting surfaces that interact with one another.

The invention claimed is:

1. A device for displaying information in a vehicle, comprising:
   a unit for creating a real image containing information relevant to a driver, to be reflected in a reflective viewing surface located directly above the field of vision actively used by the driver to survey the traffic situation, and thereby generating a virtual image;
   a second reflecting surface provided at least one of behind and beside the head of the driver, with the driver in a normal position, at essentially the same level as the viewing surface or higher;
   an end section of an optical path between the unit and the viewing surface in use extending between said second reflecting surface and the viewing surface.

2. A device according to claim 1, wherein said unit and said second reflecting surface form an integrated display unit.

3. A device according to claim 2, wherein the integrated unit is arranged to be rotatable about two axes.

4. A device according to claim 1, wherein the device is adapted for mounting in a recess provided in an existing partition wall located behind the driver.

5. A device according to claim 1, further comprising a second image unit, adapted to generate an image that is accessible to passengers in the vehicle.

6. A device according to claim 1, wherein the second reflecting surface is curved in such manner that the virtual image is magnified.

7. A system for displaying information in a vehicle, comprising:
   a reflective viewing surface provided directly above a field of vision actively used by the driver to survey the traffic situation;
   for creating a real image containing information relevant to a driver, to be reflected in the viewing surface, and thereby generating a virtual image;
   a second reflecting surface provided at least one of behind and beside a head of the driver, with the driver in a normal position, at essentially the same level as the viewing surface or higher; and,
   an end section of an optical path between the unit and the viewing surface in use extending between said second reflecting surface and the viewing surface.

8. A system according to claim 7, wherein the second reflecting surface is arranged in a rotatable manner.

9. A system according to claim 7, wherein the viewing surface is non-transparent.

10. A system according to claims 7, wherein the viewing surface is located in the plane of the windscreen.

11. A system according to claim 7, further comprising a second viewing surface to create a second virtual image.

12. A system according to claim 7, wherein the second reflecting surface is curved in such manner that the virtual image is magnified.

13. A system according to claim 7, wherein at least one of the viewing surface and an optional second viewing surface is curved in such manner that the virtual image is magnified.

14. A system comprising a device according to claim 1.

15. A system according to claim 7, wherein the unit is located at a distance from said second reflecting surface.

16. A system according to claim 15, wherein the image unit is adapted to create an image comprising a first zone intended to be displayed to passengers in the vehicle, either directly or by reflection, and a second zone intended to be reflected in said viewing surface.

17. A system according to claim 16, wherein said second zone is smaller than said first zone, so that the information displayed therein is difficult to perceive directly, and wherein said second zone is magnified by at least one of the viewing surface and the second reflecting surface.

18. A vehicle equipped with a system claim 7.

19. A system for displaying information in a vehicle, comprising:

a reflective viewing surface provided direcly above a field of vision actively used by the driver to survey the traffic situation; and the device of claim 1.

20. A vehicle equipped with a system according to claim 19.

* * * * *